United States Patent Office 3,502,745
Patented Mar. 24, 1970

3,502,745
ACRYLIC ELASTOMERIC MATERIALS
AND PROCESS THEREFOR
Robert G. Minton, Levittown, Pa., assignor to Rohm &
Haas Company, Philadelphia, Pa., a corporation of
Delaware
No Drawing. Filed Oct. 7, 1965, Ser. No. 493,922
Int. Cl. C08f 15/16, 15/40
U.S. Cl. 260—878                17 Claims

ABSTRACT OF THE DISCLOSURE

Shaped polymer structures including fibers and films are produced by means of a sequential polymerization reaction wherein an elastomeric monomer mixture, such as a soft acrylic polymer, having a second order transition temperature of 0° C. or less is polymerized in a polymer latex of a highly crosslinked hard or reinforcing "loader" polymer having a second order transition temperature of at least about 20° C. and a fine particle size of about 1 micron or less. Fibers spun from a latex of the sequential copolymer are stretch cured and are characterized by substantially improved tensile strength, equilibrium modulus and return modulus.

---

This invention relates to novel acrylic elastomeric materials; to shaped structures, particularly films and threads prepared therefrom; and to the methods of preparing such materials and the shaped products thereof.

The elastic properties of resins prepared from certain acrylic esters as ethyl acrylate, butyl acrylate and 2-ethylhexyl acrylate have long been known. Such acrylic elastomers are particularly noted for heat-resistance, flex life and resistance to oil. Accordingly, several acrylic elastomers are used commercially as the material of choice in application such as gaskets for automatic transmissions for gasoline engines wherein these outstanding properties are particularly desirable. However, acrylic elastomers are also characterized by poor tensile strength and poor return modulus. Accordingly, wider application of these elastomers particularly in shaped structures such as threads and films has been limited.

Considerable work has been carried out to reinforce acrylic elastomers by suitable means. In particular, workers have sought to improve the strength of acrylate elastomers by loading the elastomers with finely-divided fillers, including amorphous silica and certain polyalkyl methacrylates, particularly polymethyl methacrylate and polyethyl methacrylate prepared in latex form and mixed with a latex of the elastomer. Some improvement in strength has been observed as a result of this technique. However, the resulting compositions exhibit high set, loss of "rubberiness" and a tensile strength still definitely below that of competitive elastomeric products, such as natural rubber.

It has now been found that synthetic elastomeric materials prepared by a sequential polymerization process produce elastomeric products combining the known properties of acrylate elastomers with the high tensile strength and return modulus of natural rubber.

In accordance with the invention, a latex is prepared of very small, crosslinked polymeric particles using a free radical catalyst. The particles of this latex act as a reinforcing polymeric material in the final composition. The monomer or monomers used in preparing the latex comprise up to 99% of one or more vinylidene monomers which contain no halogen as part of the vinylidene radical with one or more di- or poly-functional monomer (called the "cross-linker") copolymerizable with the vinylidene monomer(s) and effective to cross-link the resulting copolymer. Suitable cross-linkers include monomers having at least two vinyl groups of sufficient reactivity to allow independent copolymerization with the vinylidene monomer(s) and monomers having only one vinyl group copolymerizable with the vinylidene monomer(s) and one or more groups effective to cross-link the copolymer by means of a reaction which is triggered, i.e., initiated, separately from the polymerization reaction. The cross-linker must be present in sufficient amount to make the resulting copolymer substantially insoluble in solvents for the polyvinylidene monomer(s). In some highly efficient systems, as styrene-divinylbenzene, as little as 0.1% of divinylbenzene based on the weight of the copolymer may be used. The maximum amount of cross-linker that may be used is not critical. By means of cost it is generally preferred to use no more than about 25% of cross-linker based on the weight of the copolymer, although more may be used if desired so long as a stable, fine-particle size emulsion is obtained. The vinylidene monomer(s) are selected so that the polymer of such monomer(s) would itself (i.e., exclusive of the cross-linker) have a second order transition temperature of at least 20° C.

After the preparation of the latex of the reinforcing polymeric material (termed the "loader"), there is then polymerized in the presence of the latex and under conditions designed to minimize the formation of new particles an elastomeric monomer mixture comprising (a) at least one $C_2$–$C_{10}$ alkyl ester of acrylic acid or a mixture of one or more such esters with up to an equal weight percent of ethylene, propylene and/or isobutylene, and, (b) from about 0.5% to 25% by weight of the elastomer of at least one ethylenically unsaturated monomer copolymerizable with the elastomer and effective to cross-link the elastomer by means of a reaction which is triggered separately from the polymerization reaction (the combination of these monomers and, optionally, the "hardener" as discussed hereafter, is termed the "elastomer mixture"). Generally, the cross-linking reaction used to cross-link the elastomer mixture will be a condensation reaction. The monomers of the elastomer mixture must be so selected that a polymer constituting the mixture has a second order transition temperature of no more than 0° C. and preferably of no more than −20° C. The elastomer mixture constitutes from 35% to 90% by weight of the total elastomeric composition while the loader represents correspondingly from 65% to 10% by weight of the total composition. The latex obtained after polymerization of the elastomer mixture in the presence of the loader is termed the "elastomer latex."

The art of emulsion polymerization is well-known and the conditions of polymerization used herein are not critical so long as a fine particle dispersion is obtained for the loader. The latexes may be made using one or more emulsifiers of anionic, cationic or non-ionic type. Mixtures of two or more emulsifiers regardless of type may be used, excepting that it is generally undesirable to mix a cationic with an anionic type, since they tend to neutralize each other. By proper selection of the emulsifier, it is possible to obtain fine particle size and assure a stable emulsion for the second sequential polymerization using less than 1% by weight of the latex of the emulsifier. For most emulsifier systems, it is preferred to use at least about 4% by weight of the latex of the emulsifier. The polymerization may be initiated at a lower emulsifier content with incremental addition of the remaining emulsifier as polymerization proceeds. When using a persulfate type of initiator, lower amounts of emulsifier may be used since the initiator itself has an emulsifying capability. The maximum amount of emulsifier is not critical and is generally determined by economic considerations. Generally no more than about 8% by weight of the total monomer charge will be used. The latex so prepared should have an average particle size of no more than about 1 micron in diameter and, preferably, from about 60 to 400 millimicrons in diameter.

The free radical catalysts may be either water-soluble or oil-soluble. The invention contemplates the use of any of the free radical catalysts known to the art as effective to catalyze the polymerization of the monomers used herein. Particularly preferred are the peroxy catalysts and the azo-type catalysts. Typical catalysts which may be used are peroxides, such as hydrogen peroxide, dibutyl peroxide, acetyl peroxide, benzoyl peroxide; alkyl percarbonates; hydroperoxides, such as t-butylhydroperoxide, cumene hydroperoxide, p-menthane hydroperoxide, etc.; perborates as the alkali metal and ammonium perborates; persulfates as the alkali metal and ammonium persulfates; etc. Other catalysts such as $\alpha,\alpha'$-azodiisobutyronitrile, diazoaminobenzene, etc. can be used. The quantity of catalyst used can be varied depending on the monomer, the temperatures and the method of addition. Generally, from about 0.001 to 5% by weight, based on the weight of the monomers, is used. If desired, the catalyst may be omitted and ultraviolet radiation used for the polymerization.

The catalyst may be used with a redox system. A buffer may be used for either or both stages of the polymerization. The catalyst, emulsifier and monomer charge may all be added initially or one or more may be added incrementally as polymerization proceeds. One type of catalyst and/or emulsifier may be used in the polymerization of the loader and a different catalyst and/or emulsifier used for the subsequent polymerization thereon of the elastomer mixture, or the same catalyst and/or emulsifier may be used for both polymerizations, as desired.

The temperature of polymerization is not critical and may be varied at the choice of the operator. Where a temperature below 0° C. is used, a freezing point depressant, as ethylene glycol, should be added to the water. When the polymerization is run at the boiling point of the mixture, reflux means should be provided. The polymerization may be conducted at atmospheric pressure or with the application of high pressures in which case temperatures exceeding the reflux temperature of the reaction mixture may be used. Optimum polymerization times will vary inter alia with the nature of the catalyst and the monomers, with the temperature and pressure and with the degree of completeness to which it is desired to carry the polymerization.

Di- and polyvinyl cross-linkers suitable for use in preparing the loader include, for example, alkylene- or alkylidene-bis-acrylamides such as methylene-bis-acrylamide, divinylbenzene, trivinylbenzene, divinyl ethers, divinyl sulfone, diallyl glycerol, glycerol trimethacrylate, triallyl cyanurate, tetraallyl melamine, hexaallyl melamine, tetraethyleneglycol, dimethacrylate, triacrylylperhydrotriazine, diallyladipate (or sebacate or maleate or fumarate), allyl acrylate, ethylene diacrylate, polyalkylene glycol diacrylate, diallylbenzene phosphonate, diethylene-glycol-bis-allyl-carbonate, 2,4-diallyloxy-6-amino-5-triazine, butylene diacrylate, ethylene dimethacrylate, vinyl 4-pentenoate, etc. A mixture of cross-linkers may be used. The other group of cross-linkers which may be used, i.e. monomers with only one vinyl group together with one or more groups effective to cross-link the copolymer by means of a reaction which is triggered separately from the polymerization reaction, are, in general, the same cross-linkers used in the elastomer mixture as described hereinafter with the exception that the cross-linking reaction must proceed inside the individual latex particles under conditions which do not break the emulsion.

Other monomers which may be copolymerized with the cross-linker to provide up to 99% of the loader include, for example, methyl methacrylate, ethyl methacrylate, t-butyl acrylate, styrene, α-methylstyrene, acrylonitrile, vinyl pyridine, vinyl toluene, etc. In addition, monomers whose homopolymers have a second order transition temperature below 20° C., such as lauryl methacrylate, may be included so long as the other monomers present other than the cross-linker are such as to give a copolymer having a second order transition temperature of at least 20° C. Because of their thermal stability, acrylate and methacrylate monomers are particularly preferred for the loader. The loader may also contain one or more monomers which can undergo a condensation reaction with one or more complementary monomers in the elastomer mixture.

After preparation of the loader latex, the monomers in the elastomer mixture are added to the latex and polymerized therein. If desired, additional emulsifier and/or catalyst may be added for the second polymerization.

It is believed that some type of chemical bonding occurs between the elastomer and the particles of the reinforcing polymeric latex. When the loader and the elastomer mixture contain complementary monomers which condense with each other, such bonding is accentuated. Even in the absence of such complementary monomers some type of bonding is believed to occur. The precise nature of the reactions occurring in the sequential polymerization used to produce the novel copolymers of the invention is not known.

The term "rubbery monomer" is somewhat inapposite as applied to monomers in that it is the polymer which is rubbery. However, with this qualification, the term "rubbery monomer" is used herein to designate those monomer or monomers responsible for the elasticity, that is, the "rubberiness" of the final product. The rubbery monomers used in the instant invention are alkyl esters of acrylic acid having from 2 to 10 carbon atoms in the alkyl chain or mixtures of one or more of such esters with each other or with up to an equal weight of ethylene, propylene and/or isobutylene which monomer or monomer mixtures produce a rubbery, non-crystalline polymer or copolymer. Moreover, the polymer produced from the monomer mixture constituting the complete elastomer mixture (i.e., the rubbery monomer or monomers, the cross-linker and where appropriate, the hardener) must have a second order transition temperature of no more than 0° C. and preferably no more than −20° C. Preferred rubbery monomers include ethyl acrylate, propyl acrylate, butyl acrylate, 2-ethylhexyl acrylate, a mixture of ethyl acrylate with from about 20–30% by weight of the mixture of ethylene, etc.

If desired, a small portion of the acrylate monomer constituting the principal component of the elastomer mixture may be replaced by a suitable monomer copolymerizable therewith and which does not interfere with the elasticity thereof. Generally, such monomers are themselves acrylates or methacrylates whose homopolymers display some elasticity. Thus, if desired, a minor amount, say about 5% by weight of the principal alkyl acrylate, may be replaced with methyl acrylate or 2-ethylhexyl methacrylate, etc. without departing from the invention.

Optionally, the elastomer mixture contains one or more $a,\beta$-monoethylenically unsaturated monomers which are effective to increase the second order transition temperature of the copolymer. (For the method of determining the second order transition temperature of a polymer, see D. G. Bannerman and E. E. Magat, page 288 in Polymer Processes, C. E. Schildknecht, ed., Interscence Publishers Inc., 1956.) Monomers having this effect on the copolymer are termed "hardeners." Any monomer whose homopolymer is hard and non-elastic at 50° C. may be used. Thus, those monomers are included whose homopolymers are highly crystalline and possess a high melting point, such as polyvinylidene chloride, and also those monomers whose homopolymers possess a high second order transition temperature. Suitable hardeners include vinylidene chloride, vinyl chloride, acrylonitrile, vinyl pyridine, methacrylonitrile, methyl methacrylate, styrene, vinyl toluene, ethyl methacrylate, acrylic acid, methacrylic acid and itaconic acid. Acrylonitrile is particularly preferred as a hardener for butyl acrylate and for 2-ethylhexyl acrylate.

Many of the monomers useful as cross-linkers for the acrylic elastomer are also highly effective as hardeners. According to one embodiment of the invention, such monomers are used in preparing the elastomeric copolymers in amounts greatly in excess of that needed to achieve cross-linking. The cross-linking reaction is then controlled so that only a portion of the available cross-linking monomer units are utilized for such cross-linking, the portion of the monomer units not utilized in the cross-linking being retained in the polymer to function as a hardener. In addition to acting as hardeners, such residual monomer units may also improve dyeing and, in some cases, increase the stability of the resulting sequential copolymers. Further, where the novel latex of the invention is used in a coating composition, such monomer units may improve the adhesion of the coatings to a variety of substrates.

The amount of hardener which may be used in the elastomer mixture will vary with the nature of the hardener or hardeners, the rubbery monomer or monomers, and on the properties desired in the product. In any event, the total of the non-rubbery monomers present in the elastomer mixture must be such that the polymer produced from the mixture does not have a second order transition temperature of more than 0° C. and preferably of not more than −20° C. Generally, the hardener should not constitute over about 20% by weight of the elastomer mixture and preferably not over about 15%. A hardener is particularly desirable with butyl acrylate and 2-ethylhexyl acrylate, whereas no hardener is generally needed with ethyl acrylate. In a preferred embodiment, non-acidic hardeners as acrylonitrile, vinylidene chloride or methyl methacrylate are used with one or more acidic hardeners as acrylic acid, methacrylic acid or itaconic acid to give the desired total hardener content.

The monomers used to cross-link the elastomeric copolymers comprise from about 0.5 to 25% by weight of the copolymer although it is believed that no more than about 5% by weight of the elastomeric copolymer is used in the cross-linking reaction. For applications requiring high extensibility, as in elastic fibers, less than 1% by weight of the monomers in the elastomeric copolymer is believed to be used in the cross-linking reaction. The use of excess amounts of the cross-linking monomer (i.e. greater than about 5%) in the elastomer mixture is sometimes advantageous, however, in making possible more rapid curing, in providing reactive groups in the resulting product which improve the dye receptivity and other properties of the polymer, and to act as hardeners as described above. Preferably, the cross-linker monomer units comprise no more than about 5% by weight of the elastomer mixture. When the cross-linker constitutes more than about 5% by weight of the elastomer mixture, care must be taken during curing to prevent excessive cross-linking which would be detrimental to the elasticity of the copolymers.

The monomers effective as cross-linkers in the elastomer mixture (and, optionally, in the loader) are unsaturated monomers copolymerizable with the alkyl acrylates and containing one or more reactive groups whose reactivity is triggered separately from the polymerization reaction. A preferred class of such reactive groups are those which are capable of undergoing a condensation reaction such as amide, alcoholic hydroxyl, amino, carboxylic acid, ureido, epoxy, etc.

Another type of monomer that may be used as a cross-linker in the elastomer mixture is one that contains one (and only one) unsaturated carbon-to-carbon linkage of sufficient reactivity to allow copolymerization with the other monomer(s) in the elastomer mixture and one or more additional unsaturated carbon-to-carbon linkages which are of too low a reactivity to undergo such copolymerization. When a copolymer is formed using such a monomer, the unsaturated linkages of low reactivity will be attached to the polymer chain as pendant groups, i.e., they will not be part of the polymer chain itself. Such pendant unsaturated linkages of low reactivity may be used to cross-link the polymer chains as by a vulcanizing process using sulfur, dicumyl peroxide or resin cures. Such processes are particularly applicable to sheet stock and to molding compositions. Examples of such cross-linkers are vinyl crotonate and 2-butenyl methacrylate. With the exception of this type of cross-linker (i.e. one giving only pendant unsaturated linkages in the copolymer), all other monomers used as cross-linkers in the elastomer mix are monoethylenically unsaturated.

Examples of monomers that may be used to provide reactive groups that can undergo a condensation reaction include the following:

FOR ALCOHOLIC HYDROXYL

Hydroxyalkyl vinyl ethers or sulfides in which the hydroxyalkyl group contains 1 to 3 hydroxyl groups and 2 to 18 carbon atoms, such as β-hydroxyethyl vinyl ether, β-hydroxyethyl vinyl sulfide, 5-hydroxypentyl vinyl sulfide, and 18-hydroxyoctadecyl vinyl sulfide.

A hydroxyl-containing ester of an α,β-monoethylenically unsaturated acid in which the hydroxy group may be in the acid or the alcoholic moiety of the ester or both such moieties may contain hydroxyl. The unsaturated acid from which the ester is derived may be monocarboxylic or polycarboxylic. Examples include acrylic, methacrylic, itaconic, maleic, fumaric, crontonic, α-hydroxyalkyl-acrylic, aconitic, citraconic, α-acryloxyacetic, and α-methacryloxypropionic. Representative esters are 2-hydroxyethyl acrylate or methacrylate, methyl α-(hydroxymethyl)-acrylate, ethyl α-(hydroxymethyl)-acrylate, butyl α-(2-hydroxyethyl)-acrylate, 2-hydroxypropyl acrylate or methacrylate, 3-hydroxypropyl acrylate or methacrylate, methyl α-(2-hydroxypropyl)-acrylate, ethyl α-(3-hydroxypropyl)-acrylate, 4-hydroxybutyl acrylate or methacrylate, 10-hydroxydecyl acrylate or methacrylate, the corresponding hydroxyalkyl crotonates, di(2-hydroxyethyl)-maleate or fumarate, di(10-hydroxydecyl) maleate or fumarate, the corresponding itaconates, mixed esters of dibasic acids containing a single hydroxy group as monohydroxyethyl-monomethyl maleate, and the like. Additionally, other substituents may be incorporated into the alkyl chain, including secondary hydroxy groups, halide radicals, nitrile radicals, and the like, such as 2,3-dihydroxypropyl acrylate, 3,5-dihydroxyamyl crontonate, 6,10-dihydroxydecyl methacrylate, di-2,6-dihydroxyhexyl maleate, and di-2-chloro-7-hydroxyheptyl fumarate. In all cases, the hydroxyl of each hydroxyalkyl group is at least two carbon atoms removed from the carbon atom of the adjacent

radical in the ester. Vinyl esters of hydroxy acids, as vinyl lactate and glycollate, can also be used to supply hydroxy functionality.

FOR AMIDES

Compounds of the formula:

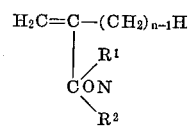

wherein $n$ is an integer having a value of 1 to 4, $R^1$ and $R^2$ are H, phenyl, methylbenzyl, benzyl, cyclohexyl, alkyl having 1 to 6 carbon atoms, hydroxyalkyl having 1 to 6 carbon atoms, N-alkoxyalkyl having 2 to 6 carbon atoms, and N-acyloxyalkyl having 2 to 6 carbon atoms, except that at least one of $R^1$ and $R^2$ must be H, hydroxyalkyl, N-alkoxymethyl or N-acyloxymethyl as above defined.

Also compounds of the formula:

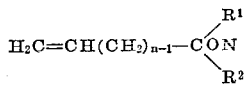

wherein $n$, $R^1$ and $R^2$ are as above defined.

Examples of suitable amides include acrylamide, methacrylamide, N-methylol-acrylamide, N-methoxymethylmethacrylamide, N-butoxymethylacrylamide, N-β-hydroxyethylacrylamide, N-methylacrylamide, 4-pentenamide, N-methylol-4-pentenamide, N-acetoxymethylacrylamide, and N-benzylacrylamide. Amides and imides of dibasic unsaturated acids may also be used.

FOR UREIDO

Compounds of the formula:

$$H_2C=C(R)ZA^1N(R^3)CXNR^1R^2$$

wherein $R^3$ is selected from the group consisting of H, alkyl groups having 1 to 4 carbon atoms, hydroxyalkyl groups having 1 to 4 carbon atoms, and alkoxymethyl groups having 2 to 5 carbon atoms, $A^1$ is an alkylene group having 2 to 8 carbon atoms, Z is O, S,

or

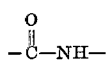

R is H or methyl, $R^1$ and $R^2$ are as defined hereinbefore, and

X is selected from the group consisting of oxygen and sulfur.

Examples of these compounds include β-ureidoethyl vinyl ether, β-ureidoethyl vinyl sulfide, β-thioureidoethyl vinyl ether, β-thioureidoethyl vinyl sulfide, β-ureidoethyl acrylate, β-thioureidoethyl methacrylate, N-(β-ureidoethyl) acrylamide, N-(β-ureidoethyl)methacrylamide, N-methyl-N'-β-methacryloxyethylurea, N-methylol-N'-methylol-N'-β-acryloxyethyl-urea, and N-methoxymethyl-N'-β-vinyloxyethyl-urea.

Among the ureido-containing monomers, those containing a cyclic ureido group of the following formula are also quite useful.

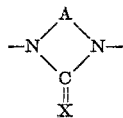

wherein X is as defined above and A is an alkylene group having 2 to 3 carbon atoms. One of the nitrogen atoms is connected to a polymerizable monoethylenically unsaturated radical and the substituent on the other nitrogen may simply be hydrogen, or it may be methylol, alkoxymethyl having 2 to 5 carbon atoms, hydroxyalkyl having 2 to 4 carbon atoms or an aminoalkyl group having 2 to 8 carbon atoms.

The preferred cyclic ureido compounds are those which contain the group:

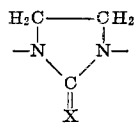

which may be termed the cyclic N,N'-ethyleneureido group.

Many monoethylenically unsaturated monomers contain cyclic ureido groups and are useful as cross-linkers for carrying out the invention. Compounds of the following formulas wherein Y represents the group of the formula above and $R^4$ is H, methylol or methoxymethyl, but is preferably H, are typical:

$$H_2C=CHYR^4$$
$$H_2C=CHXAYR^4$$

wherein X and A are as defined hereinabove;

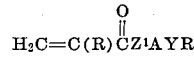

wherein $Z^1$ is selected from the group consisting of —O— and $NR^5$, $R^5$ being selected from the group consisting of H, cyclohexyl, benzyl, and an alkyl group having 1 to 6 carbon atoms, and A and R are as defined hereinabove;

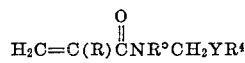

Wherein $R°$ is H or alkyl of 1 to 12 carbon atoms, and R, Y and $R^4$ are as defined hereinabove;

wherein R, $R°$, $R^4$, Y and A are as defined hereinabove. Also included are acids in which the nitrogen atom of maleamic acid, chloromaleamic acid, fumaramic acid, itaconamic acid, or citraconamic acid is substituted by, and directly connected to a group of the formula:

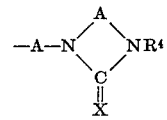

wherein A, X and $R^4$ are as defined hereinabove.

The N-substituted amic acid and esters derived from maleamic acid are typical and have the following generic formula:

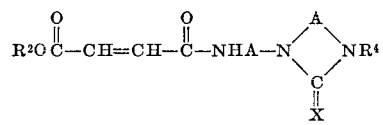

wherein A, X, $R^2$ and $R^4$ are as defined hereinabove.

The internal cyclic imides derived from maleamic acid have the formula:

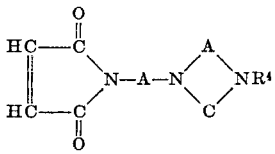

Other such monomers have the following formula:

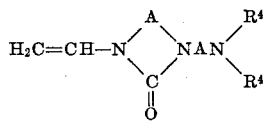

where A and $R^4$ are as defined hereinabove and one $R^4$ may be the same or different than the other;

The unsaturated dicarboxylic acid monoesters of a compound of the formula:

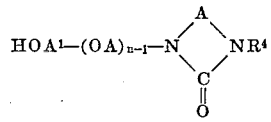

wherein $A^1$, $n$, A and $R^4$ are as defined hereinbefore, derived from maleic, fumaric, chloromaleic, itaconic or citraconic acid.

FOR EPOXY

Any monoethylenically unsaturated monomer containing a glycidyl radical may be used. Preferred monomers are glycidyl acrylate, glycidyl methacrylate, the acrylate and methacrylate esters of 3-hydroxymethyl, 3-methyl oxetane, and the vinyl ethers and sulfides containing a glycidyl radical described by Murdoch and Schneider in U.S. Patent 2,949,474.

FOR CARBOXYLIC ACID

Any $\alpha,\beta$-monoethylenically unsaturated monocarboxylic or dicarboxylic acid may be used. Examples are acrylic acid, methacrylic acid, maleic acid, fumaric acid, itaconic acid, citraconic acid, mesaconic acid, etc. Monoesters of the dibasic acids may also be used, as monomethyl maleate, monobutyl itaconate, etc. The anhydrides, as maleic anhydride, may be used, though generally hydrolysis occurs in the emulsion leading to formation of the free acid.

Other condensation-type cross-linking systems may be used such as methoxymethyl vinyl sulfide, 2-aminoethyl methacrylate, etc.

These monomers may be used alone or in combination. Suitable combinations of reactive cross-linking monomers result in a copolymer which is self-curing; that is, the two types of reactive groups present in the copolymer react with each other to cure the copolymer. Thus, methacrylamide, acrylamide, and/or 4-pentenamide with one or more of the corresponding N-methylol derivatives; hydroxyethyl acrylate with itaconic acid; glycidyl methacrylate with methacrylic acid and/or hydroxypropyl methacrylate; etc., are examples of such combinations of cross-linking monomers. If desired, a single cross-linking monomer may be used which requires that the copolymer be treated with an additional chemical reagent to effect cure. Thus, when an amide, as acrylamide, and/or methacrylamide is used as the sole crosslinking agent, the polymer must be treated with a chemical such as glyoxal, $\alpha$-hydroxyadipaldehyde, other dialdehydes, formaldehyde or a formaldehyde-yielding material during the cross-linking operation. Formaldehyde-containing polymer-forming materials such as phenol-formaldehyde, urea-formaldehyde or melamine-formaldehyde condensates may also be used. Where the elastomeric composition is formed into sheets or molding compositions, the cross-linker can be a chlorine-containing monomer or a carboxylic acid-containing monomer. In the first case, an amine and a basic divalent metal compound (as ZnO) are added to the finished polymer, while in the second case divalent metal ions or an epoxy resin or diepoxide are used to treat the polymer. A single monomer which is self-condensing may also be used, such as the N-methylol derivatives of acrylamide, methacrylate, 4-pentenamide, etc. Combinations of the same type of reactive monomer may also be used. Thus, N-methylol methacrylamide and N-methylol-4-pentenamide may be used, or glycidyl methacrylate with hydroxypropyl methacrylate and methacrylic acid, or N-methylolacrylamide with N-acetoxyacrylamide, or hydroxyethyl methacrylate with methacrylic acid and itaconic acid, etc. Generally, the cross-linking reaction is triggered by heating the elastomeric composition, generally in the presence of a suitable catalyst. If desired, a photosensitizing compound may be added to an elastomeric composition containing a suitable cross-linker and the cross-linking reaction triggered by irradiation from a suitable light source.

After completion of the two polymerization steps, if it is desired to form fibers, the elastomer latex is then spun, coagulated and cured. Spinning and coagulation are carried out in a single step. The process of emulsion spinning is described in U.S. Patent Nos. 2,869,977; 2,914,376; and 2,972,511 and the disclosures of these patents are incorporated herein. While the selection of a specific spinning process will depend upon the nature of the emulsion, by reason of its rapid penetration and volatility, thereby eliminating any problem from undesirable residues, it is preferred to use hydrochloric acid for the bath. For this acid, the coagulating bath should contain from about 9% to 37% hydrochloric acid by weight. If desired, a salt as sodium or zinc chloride can be added to the acidic bath to assist the coagulating action. Although the formation of fibers and/or films according to the invention will be described in terms of an acidic coagulating bath, it is understood that the process is not limited thereto, and either alkaline or all salt systems may be used as disclosed in the above-cited patents.

While it is preferred to spin the emulsions into a coagulating bath as described, the emulsions may also be dry-spun as described in British Patent 853,483. In dry-spinning, it is preferred to extrude the fibers onto a heated adhesive support as a steel belt coated with polytetrafluoroethylene.

The elastomeric materials of the invention need no fusion aid nor plasticizer nor heating step to promote fusion of the particles in a separate fusion step. Thus, the elastomer latex of the invention is similar to natural rubber latex in this regard. The spinning and coagulating bath is maintained at a temperature between about 0° and 85° C. and preferably between about 15° and 80° C. The higher preferred temperature gives best results for high molecular weight latexes, while for lower molecular weight latexes the preferred temperature should not be over about 40° C. At higher temperatures, the uncured fiber or film is too weak to handle easily while at the lower temperatures coagulating proceeds very slowly.

On leaving the spinning and coagulating bath, the fiber or film is washed. The washing need not be carried out to remove all traces of acid remaining, as such traces serve to catalyze many of the condensation reactions used in cross-linking the elastomeric chains. Where the elastomeric copolymer contains free carboxylic acid units in the polymer chain (as by inclusion in the hardener or cross-linker), such acidic units occurring in the chain serve as a built-in catalyst to promote the condensation step. Thus, it is not essential in the instant invention to retain a trace amount of the acid from the coagulating bath.

Curing is accomplished by heating the fiber or film in the presence of a catalyst (the nature of the catalyst being determined by the cross-linking reaction, though generally acid catalysts are used) at a temperature from about 75° to 180° C. for from about three hours to a few seconds, the longer time corresponding to the lower temperature and the shorter time of cure corresponding to the upper temperature. The precise time and temperature will depend upon the properties desired in the final product, the nature of the monomers, the necessity of avoiding the evolution of steam at a rate which would create bubbles in the fiber, on the number and type of cross-linking monomer units in the elastomer and on the concentration and nature of the catalysts provided for the curing step. In a preferred embodiment of the invention, the fiber or film is cured while held in the stretched condition.

The curing may be carried out in steps. Thus, the fiber or film may be partially cured to increase the strength of the fiber or film to permit easier handling of the material during the stretching and final cure operations. The partial curing appears important to obtain the optimum results from a final stretch-cure, though this need not be carried out as a separate step but may be the initial part of a continuous cure process. Stretch-curing achieves a certain minimum stabilization of orientation in the elastomer chains, which assists the action of the loader in improving tensile strength and modulus. As the conditions of curing tend to cause disorientation, it is evident that to obtain the best properties for a particular use from a given system requires careful control of the pre-cure, stretching and final cure. Adequate partial curing may be achieved in from 30 minutes to 0.1 minute or less at a temperature of from about 75° C. to about 150° C. Again, the longer time is used for the lower temperature, while a shorter time is used for the higher temperature. Air-drying of the fiber at room temperature achieves adequate partial curing though longer times are necessary. Preferably the partial curing is accomplished in a few seconds to five minutes at a temperature of 75° to 120° C. The fiber or film is then stretched about 100% to 800% or higher and, while held in the stretched condition, the cure is completed.

Jet-stretching, i.e., stretching by pulling the fiber away from the spinning jet, appears to change only denier and may be used to stretch the fiber any desired amount, i.e., more than 800%, to obtain the desired denier. Again, the final cure may be carried out in about three hours to seconds at 75° to 180° C. (all temperatures specified in this discussion of curing refer to the temperature of the medium surrounding the fibers, which temperature is not necessarily the temperature of the fibers or film). Where the polymer is to be processed in fiber form, the final stretch-curing operation may be carried out by winding the fiber on a bobbin under a sufficient tension to impart the desired degree of stretch and the curing carried out on the bobbin.

As will be obvious to those skilled in the art, a great variety of stretching operations may be used. Thus, the wash bath may be maintained at the temperature necessary to effect cure and the stretching carried out in the wash bath. The fibers or films may also be stretched directly while drawn from the coagulating bath onto the drying rolls. Or again, precuring may be effected in the wash bath and the stretch accomplished while drawn onto the drying rolls. Curing may take place on the drying rolls or while being drawn through a steam chamber. The stretching operation includes, optionally, a "low temperature" or "fast" stretch. The stretch-curing significantly increases the tensile strength and modulus of the resulting products without adversely affecting the other desirable properties of the materials. The ability to stretch-orient the elastomeric materials of the invention even though they contain a non-crystalline filler is highly unusual and unexpected. It is believed that this is due to the use of the cross-linking mechanism in two separate stages resulting in what can be called a "two-network matrix."

The elastomer latexes produced by the invention may be spun through a single filament jet to produce a monofil. Monofils of large diameter may be produced by spinning about 10 to 100 or more separate filaments in a multifilament jet and coalescing the separate filaments to form a single large denier filament. Thus, filaments of from about 10 to 3000 denier may be produced as desired. The latex may also be spun through a multifilament jet to produce a multifilament tow. The fiber may be chopped up into staple in which form it may be blended with non-elastic staple fibers (both natural and synthetic) and spun or may be used with a binder either alone or in combination with other fibers to produce non-woven fabrics.

The elastomeric fibers produced according to the invention have physical properties far superior to those heretofore obtainable with acrylic rubbers and equaling or surpassing natural rubber and spandex fibers in many properties. At the same time, while possessing vastly improved physical properties, the acrylic elastomeric fibers of the invention retain the premium properties of stability, color, etc. associated with the acrylic elastomers. As a result of their excellent physical properties, fibers of the acrylic elastomers of the invention may be used in any of the applications heretofore associated with natural rubber or spandex fibers.

Thus, the fibers of the invention are useful in weaving and knitting generally; in producing tricot knits and leno weaves; and in producing covered fibers as those described in U.S. Patent Nos. 3,038,295 or 3,011,302. The fibers may also be used in producing a plied fiber as described in U.S. application Ser. No. 293,661, filed on July 9, 1963 by M. Storti, and in U.S. application Ser. No. 316,601, filed Oct. 16, 1963 by M. Storti. These processes for covering or plying an elastic yarn with a nonelastic fiber restrict the maximum elongation of the composite fiber. Most commercial applications of elastic yarns require only low or medium elongation of the fiber. Thus, bathing suits are customarily made of yarn having an elongation in the range of 120% to 160%. The knitting trade generally requires yarns having an elongation from about 180% to 200%, while the weaving trade (broadloom) generally requires yarns having an elongation of only from about 100% to 140%. The hosiery trade requires yarn with an elongation of from 300% to 400%. The elastic fibers of the invention are suitable for use in most of these commercial applications of elastic yarn. While it is preferred to produce fibers directly by spinning the latex as described, it is understood that the latex may be compounded and sheeted out and used to produce cut thread.

While the novel polymers have been described principally in fabricating fibers and films, they have a variety of other useful applications. Thus, they may be used as protective coatings for wood, metal, etc.; in elastic foams; for dolls' faces, dental dams; coatings for paper, leather, textiles, etc.; gaskets; as an adhesive particularly for textiles as in flocking, laminating, etc.; mechanical goods; binders for non-woven textiles; and other applications where rubber latexes have been found useful.

In these applications the careful control of stretching and curing essential to produce optimum properties in fibers and films are unnecessary. Thus, the latex is treated like a conventional rubber latex in being coagulated, washed, compounded with various additives on suitable mixing equipment and either sheeted out or used as a molding composition. The excellent tensile strength and elasticity of the products of the invention coupled with their superior resistance to solvents, chlorine and peroxide bleaches, ultraviolet, etc. characterize these products as superior materials for such uses.

The polymeric compositions of the invention are highly desirable for producing foams characterized by resilience, compression strength and outstanding whiteness stability. Such foams may be subjected to dry cleaning or washing with regular household detergents and bleaches without yellowing or other noticeable degradation. The foams are highly resistant to ultraviolet radiation. Thus, the foams are eminently suitable for use as fabric liners, cosmetic foams, cigarette filters, air and/or oil filters, cushion filler, insulation, etc. Depending on the end use, the foams may be closed-cell or open-cell. Any of the processes customarily used in foaming latexes may be used, e.g. those described in U.S. patent application Ser. No. 350,676 filed on Mar. 10, 1964 by Gill et al. For foam applications it is preferred to use a latex which has amide-methylolamide cross-linking groups in the rubber phase and to blend an aminoplast, as a methylated melamine-formaldehyde resin, with the latex to assist the cross-linking reaction. Such combinations have outstanding scorch resistance.

The elastomer latexes of the invention are also useful in transfer coating applications such as those described in U.S. patent applications Ser. No. 390,059 filed on Aug. 17, 1964 by Storti and Ser. No. 390,669 filed on Aug. 19, 1964 by Scofield. Again, for this application it is preferred to use a latex which has amide-methylolamide cross-linking groups in the rubber phase and to blend an aminoplast as a methylated melamine-formaldehyde resin, with the latex to assist the cross-linking reaction. Desirably, maleic acid or ammonium thiocyanate is used as catalyst, as described in U.S. patent application Ser. No. 473,198 filed on July 19, 1965 by Shelley. As in the case of the compositions described by Shelley, coatings of the latex cast on a suitable adhesive surface are stable B-stage materials highly suitable for laminating operations as described by Shelley, Storti and Scofield.

The resistance of the polymers of the invention to sunlight and other effects of weather make them particularly suitable for impregnating cloth to produce novel rubber-coated fabrics suitable for rain gear, tents, tarpaulins, etc. In this application as in foam and transfer coating applications, modulus is less important than in fibers so that bulkier rubbery acrylate monomers may be used, if desired, and, in any event higher ratios of loader to rubbery phase may be used than are preferred for fiber applications. Thus, 2-ethyl hexyl acrylate alone or as a copolymer with up to about 20–30% by weight of ethylene is particularly useful as the rubbery monomor(s). In general, the rubbery phase provides flexibility at use temperature and sufficient loader is used to ensure that the composition is non-tacky at extreme use conditions, as 140° F. Preferably, acrylonitrile is used as a hardener to impart improved abrasion resistance.

In producing shaped structures having one very thin dimension, as fibers or films, it is preferred to use for the rubbery monomer ethyl acrylate, n-propyl acrylate, n-butyl acrylate, or mixtures of one or more of these acrylates with each other or with up to an equal weight amount of ethylene.

Tensile strengths of all fiber samples are determined on an Instron Tester and are measured in pounds per square inch.

Elongation as used in the examples means elongation at the break. It is measured by placing bench marks two centimeters apart on a uniformly cut sample and stretch-it until it breaks. The percent elongation is then the distance between the marks at failure minus 2, divided by 2 and times 100.

Set is the unrecovered stretch after an elastomer is stretched and allowed to relax freely. It is determined by placing bench marks on the sample two centimeters apart and stretching it 300% and holding for ten minutes. Where the sample is stretched more or less than 300%, the amount of stretch is specifically indicated. The sample is released and measured after ten minutes. Set is recorded as the length of the sample at the 10-minute measurement, minus 2, divided by 2 and times 100.

Return modulus is the stress on the return cycle after a strain larger than that at the measured point has been imposed. In determining return modulus, the sample is placed in the Instron Tester, elongated to a point below the breaking elongation, the crosshead returned to the rest position and cycled in this manner for six cycles. On the sixth cycle, the return modulus is recorded in pounds per square inch unless otherwise specified.

To stretch-cure a fiber or film, it is first partially cured and then held in a stretched condition during completion of the cure. In the examples, the "Stretch-Cure" is the amount of stretch (as a percent of the length of the partially cured fiber) maintained during completion of the cure.

To assist those skilled in the art to practice the present invention, the following modes of operation are suggested by way of illustration. All parts are by weight unless otherwise stated.

EXAMPLES 1 TO 4

First, a latex of the loader polymer is prepared. To 200 g. of deionized water are added 24 grams of the sodium salt of an alkylaryl polyether sulfonate (27% solids) and 100 grams of a monomer mixture. The materials are charged to a flask equipped with a reflux condenser, stirrer and thermometer. A nitrogen atmosphere is maintained in the flask and stirring is commenced and continued through the reaction. A solution is prepared of 0.04 gram of ammonium persulfate dissolved in 4 ml. of water. Heat is applied to the flask and when the temperature reached 70° C., half of the ammonium persulfate solution is added. Heating is continued until the beginning of reflux and then is adjusted to maintain a gentle reflux. After the initial part of the polymerization, the remainder of the ammonium persulfate solution is added and heating at reflux is continued for one hour. The contents of the flask are allowed to cool and are then filtered through a cheesecloth.

A second flask equipped as above is charged with 132.5 g. of the latex so produced, this latex containing 40 g. of polymer solids, 200 gms. of deionized water, 90.0 g. of butyl acrylate, 8.0 g. of acrylonitrile, 0.8 g. of acrylamide and 1.2 g. of N-methylolacrylamide. The polymerization is conducted exactly as for the first latex using an additional 4 ml. of 1% by weight ammonium persulfate solution added in two equal increments. The stirrer speed is adjusted as the polymerization proceeds as necessary to maintain the dispersion.

The latex so produced is extruded through a 12 mil I.D. glass capillary immersed in a bath containing concentrated hydrochloric acid. The fiber thus formed is pulled from the bath continuously by a godet and laid on sheets of polytetrafluoroethylene. The sheets containing the samples are then placed for two minutes in a circulating air oven which maintains an oven temperature of 120° C. to pre-cure the samples. The samples are then cured an additional 58 minutes in the circulating air oven held at 100° C. Table I sets forth the monomer composition in the loader and the physical properties of the fibers so produced. All of these fibers contain 40 parts of loader per hundred parts of the elastomer mixture (i.e., phr).

TABLE I

| Ex. | EMA/DVB* (parts: parts) | Tensile (p.s.i.) | Elongation (percent) | 300% Mod. (p.s.i.) | Return Mod. 150/300 (p.s.i.) | Runn. Set (percent) |
|---|---|---|---|---|---|---|
| 1 | 86/14 | 1,880 | 595 | 250 | 41 | 50 |
| 2 | 95/5 | 2,000 | 495 | 270 | 48 | 38 |
| 3 | 97.5/2.5 | 2,240 | 500 | 230 | 48 | 50 |
| 4 | 98/2 | 2,050 | 525 | 220 | 45 | 50 |

*EMA is ethyl methacrylate and DVB is divinylbenzene.

A similar elastomer latex prepared without any crosslinker in the loader, i.e., the loader consisted of 100% polyethyl methacrylate produced films which were relatively stiff and nonrubbery.

EXAMPLES 5 TO 10

A series of six elastomer latexes are made and spun into fibers as in Examples 1 to 4 using for the loader the loader of Example 4 and using as the elastomer mixture 90 grams of butyl acrylate, 8 grams of acrylonitrile, 0.8 gram of methacrylamide, and 1.2 grams of methylol methacrylamide. In each example, different amounts of loader are added per 100 parts of the elastomer mixture. Table II sets forth the amount of loader per 100 parts of elastomer mixture and the properties of the fibers prepared from the resulting elastomer latex.

spinning of the elastomer latex into fibers are carried out as in Examples 1 to 4 except that no heat is applied to the polymerization flask; the monomers used in the loader are varied; in Examples 25 and 30, 0.5 g. of pentaerythritol tetrakisthioglycolate is added as a polymerization modifier; and in Examples 25 to 27 and 30 to 32, the emulsifier consisted of a mixture of 3 grams of the alkylaryl polyether sulfonate (27% solids) used in Examples 1 to 4 and 3

TABLE II

| Ex. | Loading (phr.) | Stretch cure (percent) | Elong. (percent) | Tensile (p.s.i.) | 300% Modulus (p.s.i.) | Ret. Mod. (150/300) | Runn. Set percent/300 |
|---|---|---|---|---|---|---|---|
| 5 | 40 | 0 | 340 | 2,240 | 1,830 | 55 | 30 |
| 6 | 50 | 0 | 325 | 2,480 | 2,250 | 52 | 35 |
| 7 | 60 | 0 | 275 | 2,440 | | | |

| | | | | | Return modulus | | |
|---|---|---|---|---|---|---|---|
| | | | | | 50/200 | 100/200 | %/200 |
| 8 | 40 | 100 | 308 | 2,900 | 32 | 41 | 18 |
| 9 | 50 | 100 | 285 | 3,510 | 45 | 82 | 25 |
| 10 | 60 | 100 | 260 | 3,610 | 60 | 110 | 30 |

EXAMPLES 11 TO 22

A series of twelve elastomer latexes are prepared and spun into fibers as in Examples 1 to 4. In each case, the loader of Example 4 is used. In Examples 11 to 13 and 17 to 19, the elastomer mixture is 98 g. of combined butyl acrylate and acrylonitrile, 0.8 g. of acrylamide and 1.2 g. of methylolacrylamide while in the remaining examples the elastomer mixture is 98 g. of combined butyl acrylate and acrylonitrile, 0.8 g. of methacrylamide and 1.2 g. of methylolmethacrylamide. In each case 40 parts of loader are used per 100 parts elastomer mixture. The amounts of butyl acrylate and acrylonitrile and the properties of the fibers so produced are set forth in Table III:

parts of the sodium salt of a branched alkyl sulfate (25% solids) in place of the 5 grams of the sodium alkylaryl polyether sulfonate. In all the examples, the polymerization of the elastomer mixture is effectuated by charging the polymerization vessel described in Examples 1 to 4 with 132.5 grams of the loader latex (containing 40 g. polymer solids), 200 parts of water buffered by a mixture of HCl and KCl to a pH of 2.5, 90 grams of butyl acrylate, 8 grams of acrylonitrile, 0.8 gram of methacrylamide and 1.2 grams of N-methylolmethacrylamide. The system was purged with nitrogen for 30 minutes and then 1 ml. of a 10% ammonium persulfate solution and 1 ml. of a 10% solution of sodium thiosulfate are added and the nitrogen purge continued. The polymerization is allowed to run

TABLE III

| Ex. | BA/AN | Stretch cure (percent) | Elong. (percent) | Tensile (p.s.i.) | Return modulus (150/300) | Runn. Set percent (300) |
|---|---|---|---|---|---|---|
| 11 | 90/8 | 0 | 575 | 2,170 | 28 | 50 |
| 12 | 85/13 | 0 | 408 | 2,570 | 35 | 55 |
| 13 | 80/18 | 0 | 390 | 3,040 | 60 | 65 |
| 14 | 90/8 | 0 | 415 | 2,300 | 42 | 38 |
| 15 | 85/13 | 0 | 350 | 2,910 | 40 | 45 |
| 16 | 80/18 | 0 | 340 | 3,540 | 58 | 60 |

| | | | | | 50/200 | 100/200 | Percent 200 |
|---|---|---|---|---|---|---|---|
| 17 | 90/8 | 100 | 486 | 2,640 | 15 | 44 | 40 |
| 18 | 85/13 | 100 | 390 | 4,200 | 19 | 58 | 45 |
| 19 | 80/18 | 100 | 357 | 4,750 | 24 | 60 | 40 |
| 20 | 90/8 | 100 | 390 | 3,560 | 18 | 37 | 20 |
| 21 | 85/13 | 100 | 298 | 3,880 | 36 | 72 | 30 |
| 22 | 80/18 | 100 | 292 | 5,200 | 0 | 83 | 50 |

EXAMPLES 23 TO 32

In the following ten examples, a series of elastomer latexes are prepared. The preparation of the loader and the until conversion reached 97–99%. The stirrer speed is kept at a level just sufficient to maintain the monomer dispersed. The composition of the monomers used in preparing the loader and the properties of the fibers produced are set forth in Table IV:

sisting of 98 g. of ethyl acrylate, 0.8 g. methacrylamide and 1.2 g. methylolmethacrylamide polymerized on 40

TABLE IV

| Ex. | Loader | Stretch Cure (percent) | Elong. (percent) | Tensile (p.s.i.) | Return Modulus 80/200 (p.s.i.) | Return Modulus 100/200 (p.s.i.) | Runn. Set (percent/ 200) |
|---|---|---|---|---|---|---|---|
| 23 | EMA/DVB (98/2) | 0 | 265 | 2,440 | 33 | 89 | 25 |
| 24 | EMA/DVB (98/2) | 0 | 356 | 2,100 | 14 | 50 | 28 |
| 25 | EMA/DVB (98/2) | 0 | 300 | 2,240 | 22 | 82 | 40 |
| 26 | MMA/BGDM (98/2) | 0 | 336 | 2,850 | 23 | 60 | 35 |
| 27 | MMA/V-4-P (95/5) | 0 | 325 | 2,900 | 40 | 112 | |
| 28 | EMA/DVB (98/2) | 200 | 195 | 3,500 | | | |
| 29 | EMA/DVB (98/2) | 200 | 290 | 3,500 | 28 | 84 | 30 |
| 30 | EMA/DVB (98/2) | 200 | 227 | 4,200 | 29 | 131 | 35 |
| 31 | MMA/BGDM (98/2) | 200 | 228 | 4,840 | 47 | 141 | 25 |
| 32 | MMA/V-4-P (95/5) | 200 | 250 | 3,900 | 42 | 130 | 22 |

BGDM—1,3-butylene glycol dimethacrylate. MMA—methyl methacrylate. V-4-P—vinyl-4-pentenoate.

EXAMPLES 33 TO 36

A series of four elastomer latexes are prepared and spun into fibers. The procedure for preparing the loaders is as set forth in Examples 1 to 4 except that the monomers used for the loader in Examples 33 and 34 consisted of 95 parts styrene and 5 parts divinylbenzene, while in Examples 35 and 36 the monomers used consisted of 95 parts butyl methacrylate and 5 parts divinylbenzene. The elastomer mixture described in Examples 5 to 10 is polymerized on the loader latex (40 parts by weight of loader per 100 parts of elastomer mixture), using the process described in Examples 23 to 32, except that deionized water is used in place of buffered water and 2 ml. of a fresh 2% Formopon solution is substituted for the sodium thiosulfate solution. The spinning process described in Examples 1 to 4 is used. The properties of the fibers so prepared are set forth in Table V:

TABLE V

| Ex. | Stretch cure percent | Elong. percent | Tensile (p.s.i.) | Return modulus 50/200 (p.s.i.) | Return modulus 100/200 (p.s.i.) |
|---|---|---|---|---|---|
| 33 | 0 | 324 | 2,430 | 28 | 68 |
| 34 | 100 | 207 | 2,900 | 35 | 92 |
| 35 | 0 | 320 | 2,140 | 33 | 77 |
| 36 | 100 | 300 | 1,900 | 35 | 65 |

EXAMPLES 37 TO 40

A series of four elastomer latexes are prepared and spun into fibers. In Examples 37 and 38, the loader is prepared as described in Examples 1 to 4 using the monomer mixture of Example 4 except that 0.5 g. of pentaerythritol tetrakisthioglycolate is added as a polymerization modifier. In Examples 39 and 40 the loader consisted of 95 g. of styrene and 5 g. of divinylbenzene. The elastomer latex is prepared using 100 parts of an elastomer mixture conparts of the loader as above using the method of Examples 23–32 for Examples 37 and 38 and the method of Examples 33–36 for Examples 39 and 40. The resulting elastomer latexes are spun as in Examples 1 to 4. The properties of the fibers so produced are set forth in Table VI:

TABLE VI

| Ex. | Stretch Cure (percent) | Elong. (percent) | Tensile (p.s.i.) | Return Modulus 50/200 | Return Modulus 100/200 | Runn. Set (percent/ 200) |
|---|---|---|---|---|---|---|
| 37 | 0 | 265 | 2,660 | 55 | 140 | 28 |
| 38 | 200 | 200 | 3,500 | 57 | 190 | 35 |
| 39 | 0 | 255 | 1,470 | 28 | 85 | |
| 40 | 100 | 195 | 2,800 | 22 | 130 | |

EXAMPLES 41 TO 43

A series of three elastomer latexes are prepared and spun into fibers. In Example 41, the elastomer latex consists of 90 parts butyl acrylate, 8 parts acrylonitrile, 0.8 part methacrylamide and 1.2 part methylol methacrylamide, i.e., no loader is used in this elastomer latex. The polymerization is carried out as described in Examples 33 to 36. In Example 42, 100 parts of the elastomer latex prepared in Example 41 are mechanically mixed with 40 parts of a separately prepared loader, the loader in this case being the loader prepared in Example 27.

Finally, for Example 43, the data of Example 27 are reproduced, this example having the same chemical composition as in Example 42 but prepared by a sequential polymerization process, i.e., the elastomer latex is a chemical mixture rather than a mechanical mixture of the loader with the elastomer mixture. In each case, the elastomer latexes so produced are spun into fibers as in Examples 1 to 4. The properties of the fibers so prepared are set forth in Table VII:

TABLE VII

| Ex. | Stretch Cure (percent) | Elong. (percent) | Tensile (p.s.i.) | Return Modulus 50/200 | Return Modulus 100/200 | Runn. Set (percent/ 200) |
|---|---|---|---|---|---|---|
| 41 | 0 | 383 | 630 | 25 | 42 | 13 |
| 42 | 0 | 492 | 2,200 | | * | |
| 43 | 0 | 325 | 2,900 | 42 | 112 | 20 |

* The return modulus for Example 42 is 35 at 200/400.

EXAMPLES 44 AND 45

The elastomer latexes are prepared using the procedure described in Examples 23 to 32 and are spun into fibers as described in Examples 1 to 4. In each case, the loader consists of 38 parts methyl methacrylate and 2 parts vinyl-4-pentenoate while the elastomer mixture consists of 85 parts butyl acrylate, 13 parts acrylonitrile, 0.8 part methacrylamide and 1.2 parts methylolmethacrylamide.

The properties of the fibers so produced are set forth in Table VIII:

TABLE VIII

| Ex. | Stretch Cure (percent) | Elong. (percent) | Tensile (p.s.i.) | Return Modulus 50/200 | Return Modulus 100/200 | Runn. Set (percent/ 200) |
|---|---|---|---|---|---|---|
| 44 | 0 | 233 | 3,080 | 28 | 90 | 32 |
| 45 | 100 | 197 | 5,320 | 50 | 140 | 34 |

EXAMPLE 46

Using the procedure of Examples 1 to 4, a loader latex is prepared consisting of 90 parts methyl methacrylate and 10 parts vinyl-4-pentenoate. The polymerization vessel described in Examples 1–4 is charged with 132.5 parts (containing 40 parts of polymer) of this loader latex which has been stripped of residual monomer. To the latex is added 30 parts of a monomer mixture consisting of 89.3 parts of butyl acrylate, 8 parts of acrylonitrile, 0.7 part of 2-methyl-5-vinyl pyridine and 2.0 parts of methacrylamide. A subsurface nitrogen sparge is started and continued for 30 minutes. At this point, 1.5 parts of a solution of 0.2 part of ammonium persulfate (APS) in 9.8 parts of water is added followed after 2 minutes by 0.6 part of a solution of 0.2 part of Formopon (sodium formaldehyde sulfoxylate) in 9.8 parts of water. A mild exotherm occurs and after it levels out, the remaining 70 parts of monomer mix, which has been emulsified in 50 parts of water with 4 parts of an aqueous solution of the sodium salt of an alkylaryl polyether sulfonate (28% solids) and sparked with nitrogen, is added over a period of 1.5 hours. At the mid-point of this addition, an additional 1.5 parts of APS solution and 0.6 part of Formopon solution are added. This is repeated ½ hour after the addition is complete and after an additional three hours the emulsion is filtered through cheesecloth. The yield of polymer is 96–99% of theory.

To 200 parts of the above latex is added 0.8 part of a solution of 10 parts of the sodium salt of formaldehyde-condensed naphthalene sulfonic acid in 90 parts of water and 6.7 parts of 37% formaldehyde. This is allowed to age for 48 hours and 5 parts of a dispersion of rutile titanium dioxide prepared by mixing 200 parts of $TiO_2$, 4 parts sodium formaldehyde naphthalene sulfonate, 0.1 part of the benzyl ether of an alkylaryl polyether ethanol and 296 parts of water in a high speed mixer are added. The resulting mixture is extruded through a 20 ml. I.D. glass capillary immersed in a concentrated hydrochloric acid bath. The fiber produced is carried out of the bath over a godet, washed in a flowing water bath by wrapping on a set of canted rolls which are partially immersed in the water, dried and cured on heating, canted rolls held at 140° C. The fiber is then passed over a roll which has a thin coating of an emulsion of 7 parts of 50 centistoke silicone oil in 93 parts of combined water and emulsifier and is finally wound up on a bobbin.

The product fiber has a tensile strength of 3600 p.s.i., an elongation of 400%, is white, and may be dyed with either acid dyes or neutral metallized dyes.

EXAMPLES 47 TO 49

A series of three elastomer latexes are prepared and spun into fiber. In Example 47, the elastomer latex consists of 90 parts butyl acrylate, 8 parts acrylonitrile, and 2 parts methacrylamide; i.e., no loader is used. The polymerization is carried out as in Examples 33 to 36. In Example 48, the elastomer latex is prepared by mechanically mixing the latex of Example 47 with a latex prepared by the polymerization of 90 parts of MMA and 10 parts of vinyl-4-pentenoate, and then stripping out the residual monomer by steam distillation, in a ratio which yields 100 parts of the polymer of Example 47 for every 40 parts of loading polymer. Finally, for Example 49, the elastomer latex is prepared by polymerizing the monomers of Example 47 in the presence of the loader latex of Example 48, i.e., sequentially.

Five moles of formaldehyde per mole of amide is added to each emulsion 48 hours before spinning. The spun fiber is cured for one hour at 100° C. and the properties determined. In addition to the tensile and elongation, "equilibrium moduli" were determined on each sample by working them to 90% of their ultimate extension, allowing them to relax for two hours, then loading them with varying loads and recording the extension produced after two hours under load. The data obtained are shown in Table IX:

TABLE IX

| Example | Elong. (percent) | Tensile (p.s.i.) | Equilibrium Modulus (p.s.i.) at— 100% | 200% | 250% | 300% |
|---|---|---|---|---|---|---|
| 47 | 650 | 1,200 | 30 | 43 | 50 | 61 |
| 48 | 450 | 2,500 | 74 | 105 | 135 | 202 |
| 49 | 400 | 3,600 | 74 | 135 | 236 | 444 |

EXAMPLE 50

A loader emulsion is prepared as in Examples 1 to 4 from a monomer composition of 95 parts methyl methacrylate and 5 parts divinylbenzene. A high pressure reactor equipped with a stirrer, heat control system, ethylene pressurization system and two injector pumps is charged with 225 g. of the loader emulsion containing 70 g. of polymer solids, 275 g. of deionized water and 30.9 g. of a mixture of 150 g. of ethyl acrylate and 4.5 g. of methacrylamide. A solution of 1.0 g. of ammonium persulfate in 19 g. of deionized water is prepared and 4.0 g. of this added. The reactor is then closed, sparged with nitrogen and stirring begun. Ethylene is then added to bring the pressure to 3,900 p.s.i.g. The reactor is then heated to 80° C. and maintained at this temperature within ± 3° C. After one hour the remainder of the ethyl acrylate-methacrylamide mixture is added in 1 ml. increments, the total addition time being 6 hours. The remainder of the ammonium persulfate solution is also added during this period in 6 equal portions at one-hour intervals. At the end of the monomer and catalyst addition, the reactor is allowed to cool to room temperature, vented, and the emulsion removed. A total of 700 g. of latex containing 35% solids is produced.

A sample of the emulsion is coagulated by freezing, washed thoroughly to remove impurities, and analyzed. The composition of the rubbery phase from this analysis is methacrylamide 1.9%; ethylene 39.0±1.1%; and ethyl acrylate 59.1±1.1%.

A sample of the emulsion is prepared for spinning by adding 6:5 g. of 37% aqueous formaldehyde solution per 100 g. of emulsion solids and aging for 48 hours. The latex is then spun as in Examples 1 to 4. The fiber produced in this manner, without stretch cure, has a tensile strength of 3000 p.s.i., an elongation of 400% and a running set of 12% from 200% extension.

EXAMPLES 51 TO 53

Using the process described in Examples 1 to 4, rubbery polymers of the following compositions are polymerized in the presence of 50 parts of a loader prepared from a monomer mixture of 95 parts methyl methacrylate and 5 parts divinylbenzene. This loader is also prepared as described in Examples 1 to 4:

TABLE X

| Monomers | Parts | | |
|---|---|---|---|
| | Ex. 51 | Ex. 52 | Ex. 53 |
| 2-ethylhexyl acrylate | 85 | 85 | 95 |
| Hydroxyethyl methacrylate | 10 | 10 | |
| Methacrylic acid | 5 | | |
| Glycidyl methacrylate | | 5 | 5 |

These materials are cast onto an abhesive support (polytetrafluoroethylene-coated glass), dried at room temperature, and then cured at 200° C. for five minutes. The films so produced are about 12 mils thick, are clear, have good tensile strength, are quite snappy, and are insoluble in common organic solvents such as toluene, ethylene dichloride, perchloroethylene, and tetrahydrofuran.

What is claimed is:

1. A sequential copolymer consisting of:
   (A) from 65 to 10% by weight of a loader consisting of solvent-insoluble cross-linked polymeric particles comprising at least one vinylidene monomer, the polymer of which itself in the uncross-linked state has a second order transition temperature of at least 20° C., and which contains no halogen as part of the vinylidene radical, said loader having a particle size of no more than about 1 micron in diameter and prepared by emulsion polymerization using a free radical catalyst and
   (B) sequentially polymerized on said loader particles from 35 to 90% by weight of an elastomer prepared from a mixture of monomers consisting essentially of
      (1) at least one rubbery $C_2$–$C_{10}$ alkyl ester of acrylic acid or a mixture of one or more of said esters with up to an equal weight percent of at least one monomer selected from the group consisting of ethylene, propylene, and isobutylene, and
      (2) from about 0.5% to 25% by weight of the elastomer mixture of at least one monomer having a single unsaturated carbon-to-carbon linkage of sufficient reactivity to copolymerize with the elastomer mixture and containing at least one radical which is of too low a reactivity to copolymerize with the elastomeric mixture but which is effective to cross-link the polymer chains formed from the elastomer mixture by a reaction which is activated separately from the polymerization reaction,
   said elastomer mixture being so selected that a polymer produced from said mixture has a second order transition temperature of no more than 0°.

2. A sequential copolymer according to claim 1 wherein the elastomer mixture contains up to about 20% by weight of the elastomer mixture of at least one $\alpha,\beta$-monoethylenically unsaturated monomer effective to increase the second order transition temperature of the copolymer produced from said elastomer mixture.

3. A sequential copolymer according to claim 1 wherein said elastomer mixture is selected so that a polymer produced from said mixture has a second order transition temperature of no more than −20° C.

4. A sequential copolymer according to claim 1 wherein component (B)(1) is butyl acrylate.

5. A sequential copolymer according to claim 4 wherein the elastomer mixture contains up to about 20% by weight of the elastomer mixture of at least one monomer selected from the group consisting of methyl methacrylate, ethyl methacrylate, tertiary-butyl acrylate, styrene, $\alpha$-methyl styrene, acrylonitrile, vinyl pyridine, vinyl toluene, vinyl chloride, vinylidene chloride and methacrylonitrile.

6. A sequential copolymer according to claim 1 wherein component (B)(1) is ethyl acrylate.

7. A sequential copolymer according to claim 1 wherein component (B)(1) is a mixture of ethyl acrylate with up to 50% by weight of ethylene.

8. A sequential copolymer according to claim 1 wherein component (B)(1) is 2-ethylhexyl acrylate and wherein the elastomer mixture contains up to about 20% by weight of at least one $\alpha,\beta$-monoethylenically unsaturated monomer effective to increase the second order transition temperature of the copolymer produced from said elastomer mixture.

9. A sequential copolymer according to claim 1 wherein the vinylidene monomer is selected from the group consisting of methyl methacrylate, ethyl methacrylate, tertiary-butyl acrylate, styrene, $\alpha$-methyl styrene, acrylonitrile, vinyl pyridine and vinyl toluene.

10. A sequential copolymer according to claim 1 wherein the loader contains a monomer which can undergo a condensation reaction with one or more complementary monomers in the elastomer mixture.

11. A sequential copolymer consisting of:
   (A) from 65 to 10% by weight of a loader consisting of polymeric particles no more than one micron in diameter formed by emulsion polymerization, using a free radical catalyst, of a mixture of
      (1) at least 75% by weight of the loader of at least one vinylidene monomer which contains no halogen as part of the vinylidene radical with
      (2) from 1–25% by weight of the loader of at least one cross-linking monomer having at least two vinyl groups of sufficient reactivity to allow independent copolymerization with the vinylidene monomer, the mixture exclusive of the cross-linking monomer producing a polymer having a second order transition temperature of at least 20° C.;
   (B) sequentially polymerized on said loader particles from 35–90% by weight of an elastomer prepared from a mixture of monomers consisting essentially of
      (1) from 75–99% by weight of at least one rubbery monomer selected from the group consisting of ethyl acrylate, propyl acrylate, butyl acrylate and mixtures of said acrylate esters with up to an equal weight amount of ethylene,
      (2) from 0.5–5% by weight of the elastomer mixture of at least one $\alpha,\beta$-monoethylenically unsaturated monomer copolymerizable with the rubbery monomer and containing at least one radical selected from the group consisting of hydroxyl, amino, amido, epoxy, ureido and carboxylic acid, and
      (3) up to 20% by weight of the elastomer mixture of at least one $\alpha,\beta$-monoethylenically unsaturated monomer effective to increase the second order transition temperature of the copolymer produced from said elastomer mixture; the proportions of monomers in the elastomer mixture being selected so that the polymer produced from said mixture has a second order transition temperature of no more than −20° C.

12. A process for producing an elastomeric sequential copolymer comprising:
   (A) in the presence of an effective amount of a free radical catalyst polymerizing an emulsion of
      (1) up to about 99% by weight of at least one vinylidene monomer which contains no halogen as part of the vinylidene radical with
      (2) up to about 25% by weight of at least one di- or poly-functional monomer copolymerizable with the vinylidene monomer and effective to cross-link the resulting copolymer and being present in sufficient amount to make the resulting copolymer substantially insoluble, the polymer of (A)(1) by itself having a second order transition temperature of at least 20° C., thereby producing a loader latex;
   (B) adding to said latex an elastomer mixture of (1) a rubbery monomer selected from the group consisting of at least one rubbery $C_2$–$C_{10}$ alkyl ester of acrylic acid or a mixture of one or more of said esters with up to an equal weight percent of at least one monomer selected from the group consisting of ethylene, propylene and isobutylene, and (2) from about 0.5% to 25% by weight of the elastomer mixture of at least one monomer having a single unsaturated carbon-to-carbon linkage of sufficient reactivity to copolymerize with the rubbery monomer and containing at least one radical effective to cross-link the polymer chains formed from the elastomer mixture by a reaction which is activated separately from the polymerization reaction, the elastomer mixture being selected so that a polymer produced therefrom has a second order transition temperature of no more than 0° C.; and (C) polymerizing said elastomer mixture on the loader latex in the presence of an effective amount of a free radical catalyst and under conditions designed to minimize the formation of new particles, the loader latex constituting from about 65 to 10% by weight of the total composition and the elastomer mixture constituting correspondingly from about 35–90% by weight of the total polymer.

13. A process for producing an elastomeric shaped structure comprising:

(A) Preparing a loader latex of a copolymer of (1) from about 75–99% by weight of at least one vinylidene monomer which contains no halogen as part of the vinylidene radical, said monomer or mixture of monomers producing a polymer having a second order transition temperature of at least 20° C., and (2) from 25–1% by weight of the copolymer of at least one monomer having at least two vinyl groups of sufficient reactivity to allow independent copolymerization with the vinylidene monomer or monomers;

(B) Polymerizing on said loader latex under conditions which minimize the formation of new particles an elastomer mixture of (1) a rubbery monomer selected from the group consisting of ethyl acrylate, propyl acrylate, butyl acrylate, and mixtures of said acrylates with each other and with up to an equal weight percent of ethylene, and (2) from 0.5–5% by weight of the elastomer mixture of at least one monomer having a single unsaturated carbon-to-carbon linkage of sufficient reactivity to copolymerize with the rubbery monomer and containing at least one radical selected from the group consisting of amido, amino, carboxylic acid, hydroxyl, epoxy, uneido and carbon-to-carbon linkage of too low a reactivity to copolymerize with the rubbery monomer, and (3) up to 20% by weight of the elastomer mixture of at least one $\alpha,\beta$-monoethylenically unsaturated monomer effective to increase the second order transition temperature of the polymer produced from said elastomer mixture, the polymer produced from said elastomer mixture having a second order transition temperature of no more than 0° C.;

(C) Extruding the resulting latex into a coagulating bath through an orifice to produce a coagulated shaped structure, and (D) Curing the coagulated shaped structure.

14. A process according to claim 13 wherein the curing step is carried out to partially cure the shaped structure, then the shaped structure is stretched under tension and, while held in the stretched condition, the curing is completed.

15. A sequential copolymer according to claim 1 wherein component (B)(1) is an elastomeric cross-linked copolymer of at least one monomer selected from the group consisting of ethyl acrylate, propyl acrylate, butyl acrylate and mixtures thereof with each other, and up to an equal weight percent of ethylene.

16. A fiber prepared from the composition of claim 15.

17. A film prepared from the composition of claim 15.

References Cited

UNITED STATES PATENTS

| | | | |
|---|---|---|---|
| 3,313,748 | 4/1967 | Burke | 260—4 |
| 3,026,293 | 3/1962 | Caldwell et al. | 260—883 |
| 3,055,859 | 9/1962 | Vollmert | 260—885 |
| 3,244,655 | 4/1966 | Sullivan et al. | 260—885 |
| 3,287,444 | 11/1966 | Ennor et al. | 260—879 |

SAMUEL H. BLECH, Primary Examiner

M. J. TULLY, Assistant Examiner

U.S. Cl. X.R.

117—135.5, 161; 156—332; 260—2.5, 29.4, 29.6, 29.7, 78.5, 83.5, 881, 883, 884, 885; 264—184, 210